United States Patent
Wilson et al.

(10) Patent No.: US 7,027,776 B2
(45) Date of Patent: Apr. 11, 2006

(54) TRANSVERTER CONTROL MECHANISM FOR A WIRELESS MODEM IN A BROADBAND ACCESS SYSTEM

(75) Inventors: Eric K. Wilson, Cupertino, CA (US); Hillel Hendler, Jerusalem (IL); Raul Asia, Jerusalem (IL)

(73) Assignee: Vyyo, Inc., Palo Alto, CA (US)

( * ) Notice: Subject to any disclaimer, the term of this patent is extended or adjusted under 35 U.S.C. 154(b) by 982 days.

(21) Appl. No.: 09/771,015

(22) Filed: Jan. 26, 2001

(65) Prior Publication Data

US 2002/0159511 A1 Oct. 31, 2002

Related U.S. Application Data

(60) Provisional application No. 60/178,121, filed on Jan. 26, 2000.

(51) Int. Cl.
*H04B 1/44* (2006.01)

(52) U.S. Cl. .......................... 455/78; 455/93; 455/101; 455/104; 455/127.2; 375/219; 375/259; 375/260; 375/362

(58) Field of Classification Search ................ 455/78, 455/93, 101, 104, 127.2; 375/219, 259, 260, 375/362
See application file for complete search history.

(56) References Cited

U.S. PATENT DOCUMENTS

| | | | |
|---|---|---|---|
| 4,010,465 A | 3/1977 | Dodington et al. | |
| 4,099,121 A | 7/1978 | Fang | |
| 4,385,384 A | 5/1983 | Rosbury et al. | |
| 5,052,024 A | 9/1991 | Moran, III et al. | |
| 5,272,700 A | 12/1993 | Hansen et al. | |
| 5,311,550 A | 5/1994 | Fouche et al. | |
| 5,377,035 A | 12/1994 | Wang et al. | |
| 5,408,349 A | 4/1995 | Tsushima et al. | |
| 5,471,645 A | 11/1995 | Felix | |
| 5,481,542 A | 1/1996 | Logston et al. | |
| 5,481,561 A | 1/1996 | Fang | |
| 5,487,099 A | 1/1996 | Maekawa | |
| 5,510,859 A | 4/1996 | Douglass et al. | |
| 5,557,612 A | 9/1996 | Bingham | |
| 5,590,409 A | 12/1996 | Sawahashi et al. | |
| 5,596,604 A | 1/1997 | Cioffi et al. | |
| 5,606,664 A | 2/1997 | Brown et al. | |
| 5,625,874 A | 4/1997 | Uchida et al. | |
| 5,634,206 A | 5/1997 | Reed et al. | |
| 5,666,646 A | 9/1997 | McCollum et al. | |
| 5,724,385 A | 3/1998 | Levin et al. | |
| 5,734,589 A | 3/1998 | Kostreski et al. | |
| 5,740,525 A | 4/1998 | Spears | |
| 5,752,161 A | 5/1998 | Jantti et al. | |
| 5,796,783 A | 8/1998 | Crawford | |
| 5,809,090 A | 9/1998 | Buternowsky et al. | |

(Continued)

*Primary Examiner*—Doris H. To
*Assistant Examiner*—Sanh Phu
(74) *Attorney, Agent, or Firm*—John W. Carpenter; Reed Smith, LLP

(57) ABSTRACT

A system and method for controlling a transverter from a wireless modem unit (WMU). A WMU delivers a control signal to a transceiver. This signal is outside the IF signal data range (preferably below 11 MHz). The signal is carried on the cable between the transceiver and the WMU. This signal is detected by the transceiver, and determines the timing and the control information. The signal is ASK modulated to enable low data rate transfer of messages between the WMU and the transceiver. The control signal is detected at the transverter using a detector circuit. Additionally, specific transverter detection circuits are disclosed to detect the control signal.

15 Claims, 4 Drawing Sheets

U.S. PATENT DOCUMENTS

| | | |
|---|---|---|
| 5,809,406 A | 9/1998 | Taki et al. |
| 5,809,427 A | 9/1998 | Perreault et al. |
| 5,818,825 A | 10/1998 | Corrigan et al. |
| 5,831,690 A | 11/1998 | Lyons et al. |
| 5,862,451 A | 1/1999 | Grau et al. |
| 5,867,528 A | 2/1999 | Verbueken |
| 5,896,414 A | 4/1999 | Meyer et al. |
| 5,903,558 A | 5/1999 | Jones et al. |
| 5,909,384 A | 6/1999 | Tal et al. |
| 5,937,005 A | 8/1999 | Obuchi et al. |
| 5,940,743 A | 8/1999 | Sunay et al. |
| 5,963,843 A | 10/1999 | Sit et al. |
| 5,963,870 A | 10/1999 | Chheda et al. |
| 5,974,106 A | 10/1999 | Dupont |
| 5,978,855 A | 11/1999 | Metz et al. |
| 5,991,286 A | 11/1999 | Labonte et al. |
| 6,009,310 A | 12/1999 | Motohashi |
| 6,035,008 A | 3/2000 | Kim |
| 6,052,408 A | 4/2000 | Trompower et al. |
| 6,072,839 A | 6/2000 | Mondal et al. |
| 6,075,787 A | 6/2000 | Bobeck et al. |
| 6,111,887 A | 8/2000 | Daily et al. |
| 6,112,232 A | 8/2000 | Shahar et al. |
| 6,128,588 A | 10/2000 | Chacon |
| 6,140,911 A | 10/2000 | Fisher et al. |
| 6,141,356 A | 10/2000 | Gorman |
| 6,157,311 A | 12/2000 | Berkovich |
| 6,160,447 A | 12/2000 | Huang |
| 6,172,970 B1 | 1/2001 | Ling et al. |
| 6,185,227 B1 | 2/2001 | Sipola |
| 6,195,697 B1 | 2/2001 | Bowman-Amuah |
| 6,704,379 B1 * | 3/2004 | Nagashima ................ 375/355 |
| 6,813,326 B1 * | 11/2004 | Miyashita et al. .......... 375/362 |
| 6,842,623 B1 * | 1/2005 | Koscal ...................... 455/462 |

* cited by examiner

TRANSVERTER CONTROL MECHANISM FOR A WIRELESS MODEM IN A BROADBAND ACCESS SYSTEM

CROSS-REFERENCE TO RELATED APPLICATIONS

This application claims priority from U.S. Provisional Patent Application entitled TRANSVERTER (TRANSCEIVER) CONTROL MECHANISM FOR A WIRELESS MODEM IN A BROADBAND WIRELESS ACCESS SYSTEM, filed Jan. 26, 2000, Application Ser. No. 60/178,121, the disclosure of which is herein incorporated by reference.

BACKGROUND OF THE INVENTION

1. Field of the Invention

The present invention relates generally to the field of data transmission, and more particularly to a method and apparatus for control of a transverter or transceiver by a modem in a wireless modem termination system.

2. Description of the Related Art

The customer side of a Point to Multi-point wireless system includes an RF Front End Transceiver or Transverter (the terms are used interchangeably herein) and a Wireless Modem Unit (WMU), which might be implemented as one unit or as separated units connected by an RF Cable. The transceiver is implemented on the Downstream path as a Low Noise Amplifier (LNA) and Down Converter (DC), and on the Upstream path as an Up Converter (UC) and Power Amplifier (PA) for the transmitted signal. The physical layer of the WMU includes a Modulator for the transmitted signal, a Demodulator for the received signal and a MAC layer to control both of them and also for controlling the Transceiver.

In the prior art systems, there is a need to control some parameters of the transceiver by the WMU. There is also a need to establish a control signal by the WMU, which will be decoded simply by the transceiver, and will not interfere with RX and IX signals. The following parameters should therefore be controlled:
1) Power Amplifier On/Off:
2) Upstream and downstream gain control:
3) Upstream and downstream frequency control
4) Transverter reference control oscillator control
5) Antenna Diversity Control

SUMMARY OF THE INVENTION

In general, according to the present invention, a WMU delivers a control signal to a transceiver. This signal is outside the IF signal data range (preferably below 11 MHz). The signal is carried on the cable between the transceiver and the WMU. This signal is detected by the transceiver, and determines the timing and the control information. The signal is ASK modulated to enable low data rate transfer of messages between the WMU and the transceiver.

In one embodiment, a pre-preamble modulator 10 is constructed as part of the main modulator or as a parallel circuit to the main modulator 12, processing unit 14, and summation circuit 16 or the main modulator and control carriers. The added pre-preamble modulator 10 preferably delivers a carrier at a frequency outside the data band (perhaps at 5.5 MHz for MMDS systems).

The pre-preamble is used to alert the output stage (transmit switch or power amplifier 18) of an impending data burst so that it has sufficient time to configure for the data transmission. The pre-preamble signal might be sent to the transverter a few microseconds prior to the data burst, triggering a one-shot function which would timeout after the burst is finished or which could be retriggered by subsequent bursts.

The cable from the WMU is connected to a diplexer (DPLX) 22 which separates the downstream (above 91 MHz) and upstream (below 65 MHz) signals. The upstream signal includes the transmitted data signal, and the control signal. The control path includes a simple detector and demodulator 28. The detected signal controls the ON/OFF state of the transmitter switch 30, and also other transceiver parameters.

In a second embodiment, a modem is programmed to a low frequency (5.5 MHz or 10.7 MHz for example) in order to send control data. When the modem has actual data to transmit, the output frequency is programmed to the appropriate channel and the data bursts are transmitted. The control signal is detected at the transverter using a band pass filter and detector circuit.

Additionally, specific detection circuits are disclosed to detect the control signal.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
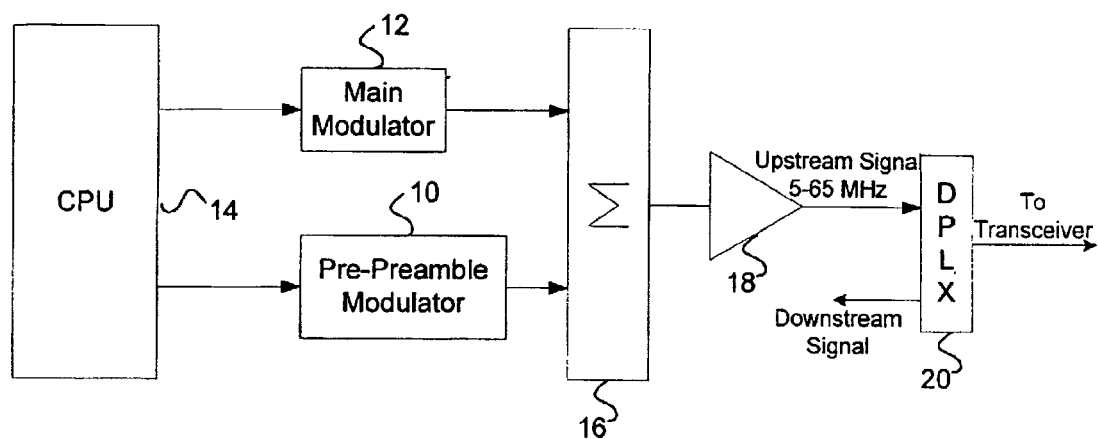
FIG. 1 is a block diagram of an implementation of the pre-preamble generation circuitry.

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method and apparatus for modem control of the transverter in a wireless modem data transmission system. Any and all such modifications, equivalents and alternatives are intended to fall within the spirit and scope of the present invention.

In general, the present invention relates to the DOCSIS 1.0 (Data Over Cable Service Interface Specification) and DOCSIS 1.1 specifications promulgated by Cable Labs, the disclosures of which are herein incorporated by reference. Whereas the DOCSIS standards only address data over cable, the present invention also applies to wireless data transmission.

As noted above, it would be desirable to have a system to control the following five parameters:

1) Power Amplifier On/Off:

The upstream path is based on a burst transmitter. In order to reduce the upstream noise produced by multiple WMU's, the upstream path in the transceiver should include an On/Off switch (squelch). The switch should be controlled by the WMU to be in the ON state for the transmitted burst, and to be in the OFF state between bursts. This feature also reduces the power consumption and, therefore, the thermal rise due to continuous bias on the output power amplifier stage, thereby increasing reliability.

2) Upstream and Downstream Gain Control:

Upstream and downstream dynamic range of the received signal in a wireless system can be more than 60 or 70 dB. Current systems typically use a fixed gain transceiver and the whole dynamic range is controlled within the WMU, or by inserting fixed attenuators between the transceiver and the WMU. This implementation limits the dynamic range and it is not flexible (i.e. requires a technician for field changes). Inserting gain control or switch attenuators in the transceiver TX and RX path improves the dynamic range. Control of this gain by the WMU improves the dynamic range and flexibility of the system.

3) Upstream and Downstream Frequency Control

The transverter is typically a block converter which folds several channels or sub-channels into the demodulation range of the modem for the downstream and which converts all or some portion of the modem's upstream output to the RF band. In some systems, the demodulation tuning range of the modem is narrower than the RF bands which might be served. In this case, a synthesizer may be incorporated in the transverter to divide the RF band into several narrower sub-bands which can be demodulated by the modem. In many cases, the upstream bandwidth of the modem is less than the available RF transmit band. Conventionally, multiple, fixed-conversion transverters are deployed in an attempt to optimally utilize the available RF channels. However, it would minimize the logistical aspects if a single (or a very few) versions of the transverter could be used to address a wide range of bands.

Adding an inexpensive control system from the modem to the transverter could be used to address the tuning and control issue.

4) Transverter Reference Control Oscillator Control

The transverters are typically installed in outdoor locations where the temperature may vary widely. The crystal-controlled oscillators are generally priced according to their temperature drift performance. There are several conventionally used solutions to this drift problem. A more stable (and more expensive) oscillator circuit may be used or an external reference tone may be provided to the transverter. Alternatively, since the modem can infer from measurements made in the demodulation circuitry, the approximate amount and direction of correction required for the transverter's oscillator, it is feasible for the modem to control the frequency of the transverter's reference oscillator through a long loop control.

5) Antenna Diversity Control

Installation teams and subscribers would like to minimize the time for installation of a CPE antenna, improve the aesthetics (appearance), and eliminate the requirement for follow up subscriber premise trips when antennas need to be reoriented. Having the ability to remotely steer the antenna beam would allow compensation for multipath minimization as well as traffic load balancing in a multiple cell deployment.

All of these tasks may be done with one-way communication from the modem to the transverter (or integrated transverter antenna). With the exception of the first concept, the data rate of the control link could be extremely slow. The invention detailed herein is outlined in two approaches: The first addresses all five control requirements with a "Pre-preamble configuration" and the second address all except the first one with an "out of passband tone" configuration.

In any of present embodiments, appropriate integrity checking should be performed to assure a command is correctly interpreted. This might be as simple as a short header to set the reference level to an appropriate value, the command sequence, and a check sum. If the check sum is incorrect, the command should be ignored. When the system sees that the command has not accomplished the desired effect, it may send it again. There might be some limit as to how often repeated commands are sent to reduce overhead for units which do not respond as anticipated or which have reached their limits. An alarm or log of seemingly ignored commands might be used by operation personnel or engineering.

According to the present invention, the WMU delivers a control signal to the transceiver. This signal is outside the IF signal data range (preferably below 11 MHz). The signal is carried on the cable between the transceiver and the WMU. This signal is detected by the transceiver, and determines the timing and the control information. The signal is ASK modulated (or with another simply detected modulation) to enable low data rate transfer of messages between the WMU and the transceiver.

Implementation I—Squelch and Control Commands

As shown in FIG. 1, a pre-preamble modulator 10 is constructed as part of the main modulator or as a parallel circuit to the main modulator 12, processing unit 14, and summation circuit 16 or the main modulator and control carriers. The added pre-preamble modulator 10 preferably delivers a carrier at a frequency outside the data band (perhaps at 5.5 MHz for MMDS systems). The carrier is modulated ON/OFF (according to the well known ASK or Amplitude Shift Key method) to implement the pre-preamble timing and to carry the modulated data. The TX real data carrier is preferably above 14 MHz, such that it is easy to separate the signals at the transceiver. The separation in time between the control signal and the transmitted signal, enables implementation of the pre-preamble modulator 10 either by a separate block, or internally in the main modulator 12.

The pre-preamble is used to alert the output stage (transmit switch or power amplifier 18) of an impending data burst so that it has sufficient time to configure for the data transmission. The pre-preamble signal might be sent to the transverter a few microseconds prior to the data burst, triggering a one-shot function which would timeout after the burst is finished or which could be retriggered by subsequent bursts (see FIG. 3).

Figure 2:
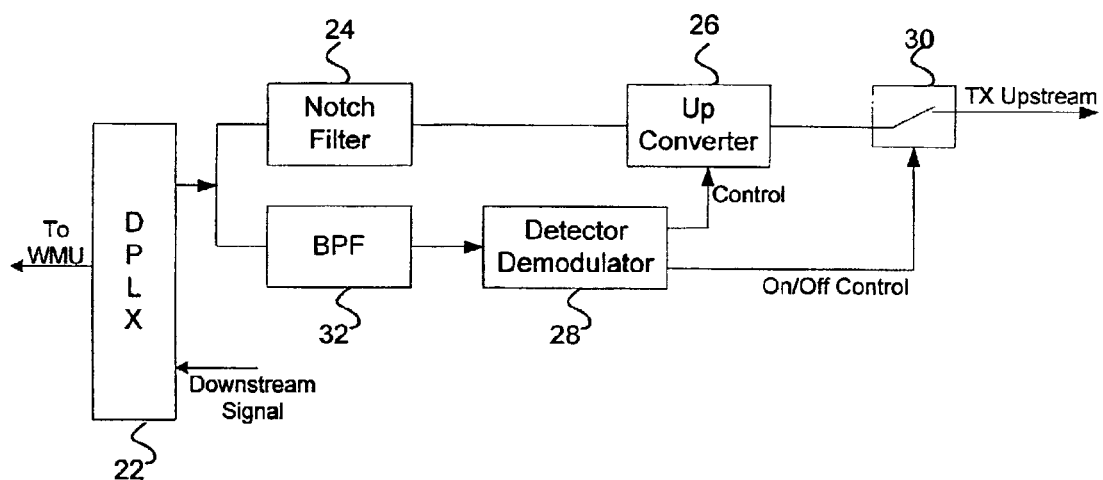
FIG. 2 is a block diagram of a transverter detection and control circuit.

As shown in FIG. 2, the cable from the WMU is connected to a diplexer (DPLX) 22 which separates the downstream (above 91 MHz) and upstream (below 65 MHz) signals. The upstream signal includes the transmitted data signal, and the control signal. The transmit signal path preferably uses a low cost commercial notch filter 24 at 5.5 MHz before the up converter 26 (or a relatively narrow band pass filter at the IF). The filter 26 reduces the out-of-band control signal such that it will not interfere, as a spurious signal to the main transmitted signal. The control signal is also used by the TX Switch 30 or power amplifier, by using the pre-preamble signal before the "ON" state of the switch.

The control path includes a simple detector and demodulator 28. A band-pass filter 32 filters the signal before the detector and demodulator block 28. The demodulator 28 might be implemented as a low cost processor that will receive the "state," and will control the required parameters. The detected signal controls the ON/OFF state of the transmitter switch 30, and also other transceiver parameters.

The control signal includes two types of information—fast and slow information messages. Control messages that are not changing rapidly are carried on a slow data modulated carrier. The modulation is a simple ASK modulation (On/Off Modulation), but other simple detection modulations techniques also can be used. Rapidly changing information includes the squelch processing controlling the On/Off switch timing. In order not to be sensitive for detecting and switching timing, a pre-preamble signal is used to "close" the switch.

Figure 3:
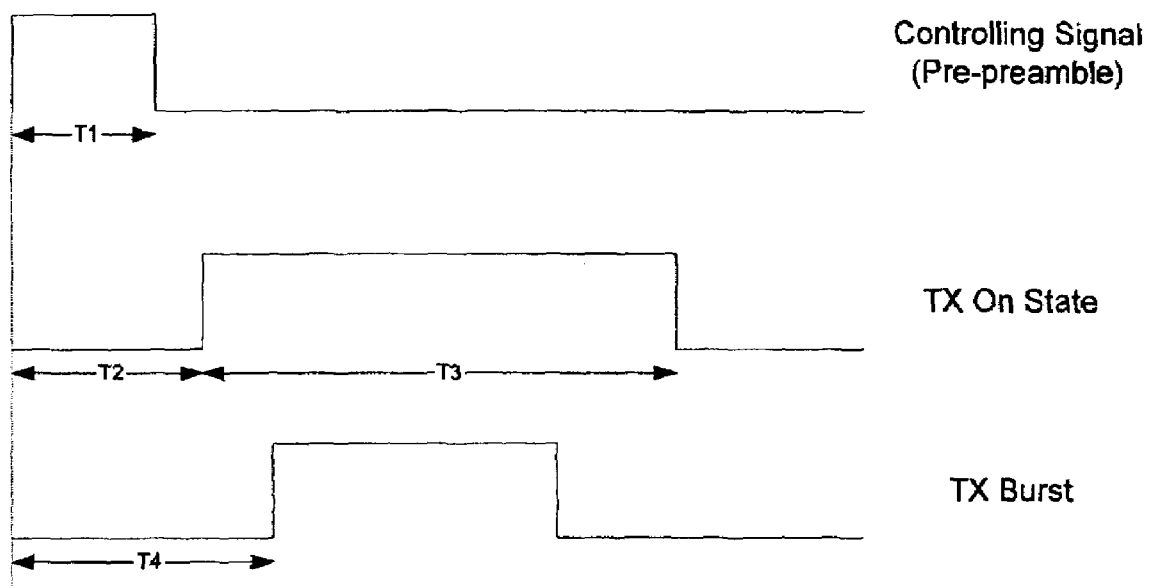
FIG. 3 is a timing diagram illustrating the timing relationships between the pre-preamble control signal and the transceiver ON state and data burst.

FIG. 3 is a timing diagram illustrating timing relationships between the pre-preamble control signal and the transceiver ON state and data burst. The main TX data burst timing is controlled by the WMU, synchronizing with the Wireless Hub (base station) timing. The pre-preamble signal is transmitted before the main TX data burst. The pre-preamble length is T1. The transceiver ON/OFF switch is moving to the "ON" state at T2, and it stays at this state for T3. T3 is longer then the maximum burst length. The main TX data burst is activated at T4, only after T4 is moved to the "ON" state.

Implementation II—Control Commands

When squelch control is not required or is implemented in another way (such as outlined above), there may still exist the requirement for a low cost method of controlling various functions of the transverter which are not time sensitive. These may be controlled by using the modem's frequency synthesizer functionality. By programming the modem to a low frequency (5.5 MHz or 10.7 MHz for example) and then sending bursts out with long or short periods, control bits may be communicated. When the modem has actual data to transmit, the output frequency is programmed to the appropriate channel and the data bursts are transmitted.

Figure 4:
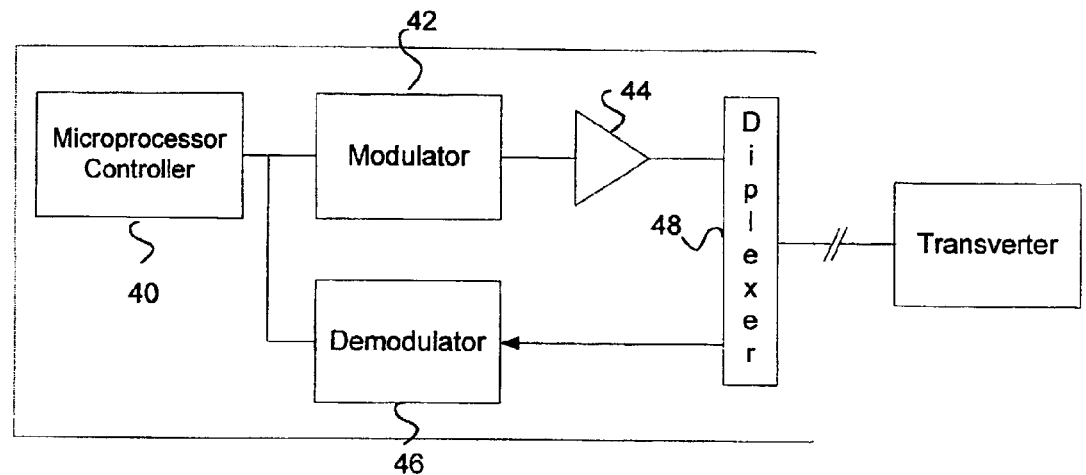
FIG. 4 is a block diagram of a WMU pre-preamble configuration.

FIG. 4 is a block diagram of a WMU pre-preamble configuration, which generates a control signal, using the modem's incorporated modulator 42, that is transmitted prior to the beginning of the normal preamble as part of the burst protocol for implementing the modem portion of the invention. A processor 40 controls the modulator 42. A diplexer 48 operates as described above with reference to FIG. 1. The major advantage of this approach is that there is no hardware change in the modem—just firmware.

This approach requires no changes in the modem hardware—just a set of commands from the WMTS which tells it what frequency to transmit on and two dummy packets (a short one and a long one) or one dummy packet which is assigned time slots at close or wide intervals.

Figure 5:
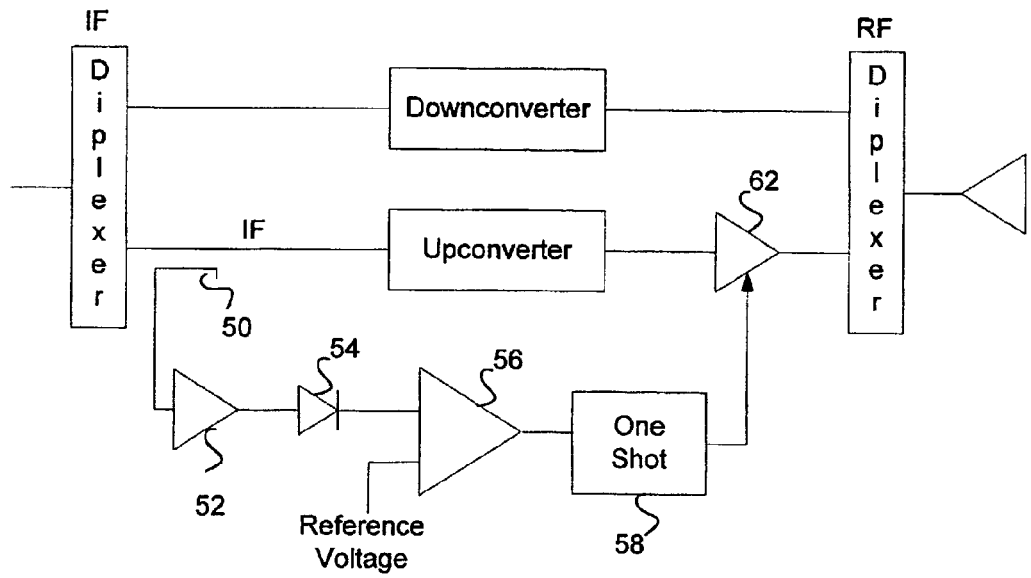
FIG. 5 is a block diagram of one implementation of a transceiver for detection of the control signal.

FIG. 5 is a block diagram of one implementation of a transceiver detection circuit for the control signal configuration. The modem's IF signal is sampled at coupler or tap 50, amplified by an amplifier 52 and detected by a detector 54. The detected signal is then sent to a comparator 56 which trips a one-shot 58 whenever the detected signal exceeds a reference limit 60. The one-shot 58 enables the power amplifier output circuit 62 between the pre-preamble and the preamble. The one-shot 58 shuts off the output sometime after the longest packet burst length.

Figure 6:
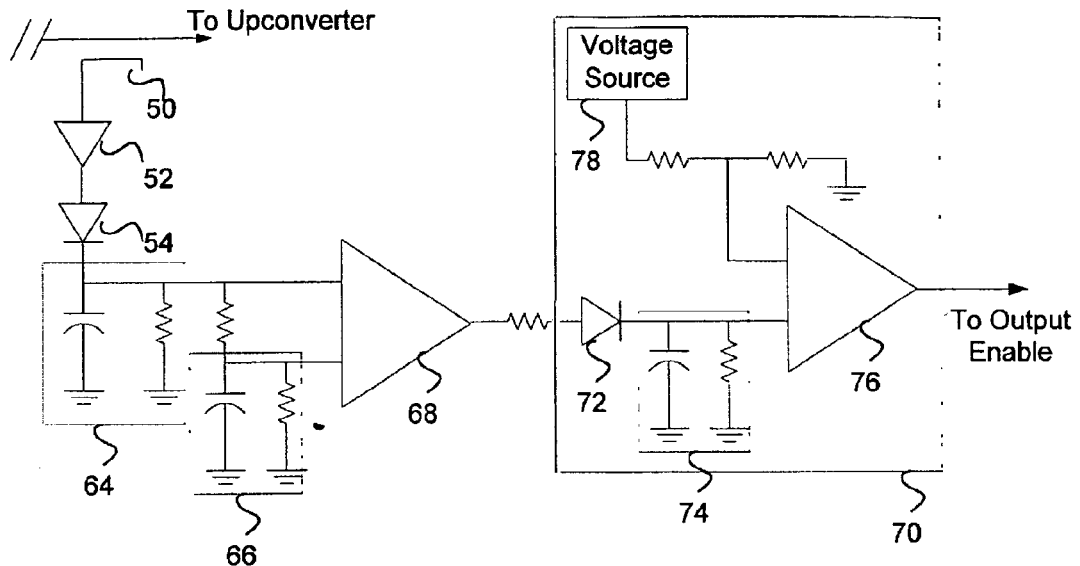
FIG. 6 is one implementation of the detection and one-shot circuits, with automatic reference level determination.

FIG. 6 is an example of how to inexpensively implement the detector 54 and the one-shot circuit 58, with the added advantage of an automatic reference level determination circuit. The modem's output level might be programmed to be at the maximum level during the pre-preamble and then reduced to the correct level based on the long-loop commands to facilitate detection of the pre-preamble in the transverter and the signal burst in the WMTS demodulator at the wireless hub.

As shown by the schematic in FIG. 6, a sample of the signal from the modem is fed from the coupler 50 to the detector diode 54 and two filters 64, 66. One filter 64 has a fast response time and the second filter 66 has a slower response time. The slow filter 66 determines a rough average value of the coupled/detected signal. The fast response filter 64 smoothes the detector output. A first comparator 68 determines when the detector output is above the average level and this then is interpreted as a "True" or "One" state. Conversely, when the average value is higher than the current value, then the comparator 68 output is "False" or "Low". The output of the comparator 68 is sent to a one-shot circuit 70 comprising a diode 72, a low pass filter 74, a second comparator 76, and a reference voltage 78 for the second comparator. The second comparator 76 should be designed to have hysteresis to prevent chatter. The overall functionality of this circuit is to allow the upconverter input to be used in it's normal range of operation to inexpensively enable the output of the transmitter section of the transverter.

Figure 7:
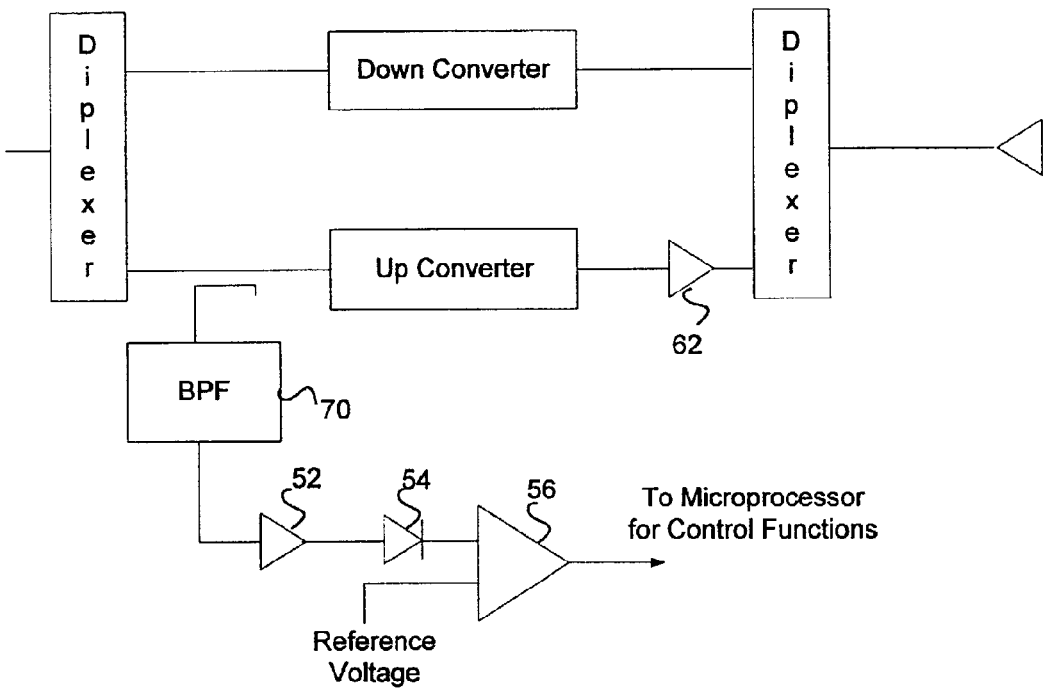
FIG. 7 is an alternative implementation of the transverter detection circuit.

FIG. 7 is an alternate implementation of the transverter detection circuit with the added advantage being useful for reception of communication commands from the modem which are out of the passband of the IF to RF conversions in the modem. The bandpass filter 80 is outside the band of data communications for the transverter's IF and inside the band for the modem's output range. This allows the modem to send commands to the transverter which are not passed through the RF power amplifier to the antenna because the are blocked by the upconverter's filtering. However, those commands are passed through the band pass filter 80 shown in the figure and detected and sent to a comparator or microcontroller. This allows the modem to tune to an out of band frequency, say 10.7 MHz, and send commands to the microcontroller which may then be used to control various parameters in the transverter.

The invention further provides and enables:

A unique squelch procedure for controlling the ON/OFF switch of the transceiver by the WMU.

A low rate data message transfer between the WMU and the transceiver, enabling control of several parameters in the transceiver.

A control signal using a separate and lower frequency then the TX signal. The carrier is below 11 MHz (typically 5.5 MHz), enabling low cost filter separation from the TX signal at the transceiver, and eliminating interference on the TX signal.

A basic low cost hardware implementation for the WMU and transceiver.

The present invention therefore provides a novel transverter control mechanism in a wireless modem for broadband access. Although the present invention has been shown and described with respect to preferred embodiments, various changes and modifications lie within the spirit and scope of the claimed invention. Thus, the corresponding structures, materials, acts, and equivalents of all means or step plus function elements in the claims in this patent application or any applications claiming priority there from are intended to include any structure, material, or acts for performing the functions in combination with other elements as specifically claimed.

What is claimed is:

1. A transverter control system comprising:
a diplexer connected to a wireless modem unit (WMU) and receiving a downstream signal and outputting an upstream signal;
a transmission path comprising:
a notch filter having an input connected to the upstream signal;
an upconverter connected to the notch filter; and
a transmitter switch connected to an output of the upconverter;
a control path comprising:
a band pass filter having an input connected to the upstream signal; and
a detector and demodulator unit connected to the band pass filter;
wherein the detector and demodulator unit outputs a control signal to control the upconverter and the transmitter switch based on a pre-preamble signal received from the wireless modem unit.

2. A transverter control system for a wireless modem, the system comprising:
a wireless modem unit (WMU) comprising:
a processor;
a modulator controlled by the processor;
a pre-preamble modulator controlled by the processor;
a summation circuit connected to receive an output from the modulator and an output from the pre-preamble modulator; and
an output stage connected to an output of the summation circuit;
wherein a pre-preamble signal generated-by the pre-preamble modulator alerts the output stage of an impending data burst; and
a transverter control system comprising:
a diplexer connected to a wireless modem unit (WMU) and receiving a downstream signal and outputting an upstream signal;
a transmission path comprising:
a notch filter having an input connected to the upstream signal;
an upconverter connected to the notch filter; and
a transmitter switch connected to an output of the upconverter;
a control path comprising:
a band pass filter having an input connected to the upstream signal; and
a detector and demodulator unit connected to the band pass filter;
wherein the detector and demodulator unit outputs a control signal to control the upconverter and the transmitter switch based on a pre-preamble signal received from the wireless modem unit.

3. A method of control of a transverter in a wireless access system, the method comprising:
creating a pre-preamble signal and a control data signal in a wireless modem unit (WMU);
transmitting the pre-preamble signal as a notification signal;
transmitting the control data signal to the transverter;
detecting the pre-preamble signal at the transverter, and in response to the detected signal, disabling a transmitter switch;
decoding and processing the control data signal; and
resetting the transmitter switch.

4. The transverter control system according to claim 1, wherein:
the wireless modem unit (WMU) comprises,
a processor;
a modulator controlled by the processor,
a pre-preamble modulator controlled by the processor,
a summation circuit connected to receive an output from the modulator and an output from the pre-preamble modulator, and
an output stage connected to an output of the summation circuit;
wherein a pre-preamble signal generated by the pre-preamble modulator alerts the output stage of an impending data burst.

5. The transverter control system according to claim 1, wherein the WMU comprises a pre-preamble modulator configured to produce a carrier at a frequency outside of a normal data band.

6. The transverter control system according to claim 5, wherein the carrier is Amplitude Shift Key modulated.

7. The transverter control system according to claim 6, wherein the diplexer is connected at an output stage of the, wireless modem unit (WMU).

8. The transverter control system according to claim 7, wherein the Wireless Modem Unit (WMU) is part of a wireless broadband access system.

9. The transverter control system according to claim 1, wherein the Wireless Modem Unit (WMU) is part of a wireless broadband access system.

10. The transverter control system according to claim 2, wherein the Wireless Modem Unit (WMU) is part of a wireless broadband access system.

11. The transverter control system according to claim 3, wherein the Wireless Modem Unit (WMU) is part of a wireless broadband access system.

12. The transverter control system according to claim 7, wherein the impending data burst is a Data Over Cable Service Interface Specification (DOCSIS) formatted message in a broadband wireless access system.

13. The transverter control system according to claim 1, wherein the upstream and downstream signals facilitate a Data Over Cable Service Interface Specification (DOCSIS) formatted message in a broadband wireless access system.

14. The transverter control system according to claim 2, wherein the impending data burst is a Data Over Cable Service Interface Specification (DOCSIS) formatted message in a broadband wireless access system.

15. The transverter control system according to claim 3, wherein the preamble and control signals facilitate a Data Over Cable Service Interface Specification (DOCSIS) formatted message in a broadband wireless access system.

* * * * *